United States Patent
Carrion-Rodrigo

(10) Patent No.: US 8,908,661 B2
(45) Date of Patent: Dec. 9, 2014

(54) METHOD OF PROBING A NODE

(75) Inventor: Immaculada Carrion-Rodrigo, Helsinki (FI)

(73) Assignee: Nokia Corporation, Espoo (FI)

(*) Notice: Subject to any disclaimer, the term of this patent is extended or adjusted under 35 U.S.C. 154(b) by 454 days.

(21) Appl. No.: 10/875,584

(22) Filed: Jun. 25, 2004

(65) Prior Publication Data
US 2005/0174945 A1 Aug. 11, 2005

(30) Foreign Application Priority Data
Feb. 10, 2004 (GB) .................................. 0402893.2

(51) Int. Cl.
*H04W 4/00* (2009.01)
*H04L 29/06* (2006.01)
*H04L 29/12* (2006.01)
*H04W 8/26* (2009.01)

(52) U.S. Cl.
CPC ................ *H04L 29/06* (2013.01); *H04L 69/24* (2013.01); *H04L 29/12801* (2013.01); *H04W 8/26* (2013.01); *H04L 61/6004* (2013.01)
USPC ........................................................ 370/338

(58) Field of Classification Search
USPC ............................ 370/338, 241, 235; 709/229
See application file for complete search history.

(56) References Cited

U.S. PATENT DOCUMENTS

| 2003/0081583 | A1 | 5/2003 | Kowalski |
| 2003/0115339 | A1 | 6/2003 | Hodoshima |
| 2003/0134650 | A1* | 7/2003 | Sundar et al. .................. 455/465 |
| 2003/0163558 | A1 | 8/2003 | Cao et al. |
| 2003/0174690 | A1* | 9/2003 | Benveniste ..................... 370/350 |
| 2003/0221006 | A1 | 11/2003 | Kuan et al. |
| 2004/0017794 | A1* | 1/2004 | Trachewsky .................. 370/338 |
| 2004/0248557 | A1 | 12/2004 | Muratsu |
| 2005/0068928 | A1* | 3/2005 | Smith et al. .................... 370/338 |
| 2005/0097356 | A1* | 5/2005 | Zilliacus et al. .............. 713/201 |
| 2005/0174943 | A1* | 8/2005 | Wang .............................. 370/235 |
| 2005/0176450 | A1 | 8/2005 | Bantukul et al. |
| 2006/0092888 | A1* | 5/2006 | Jeong et al. .................... 370/338 |
| 2006/0193258 | A1* | 8/2006 | Ballai ............................ 370/230 |

FOREIGN PATENT DOCUMENTS

EP 1 307 003 A2 5/2003
WO WO 03/088578 A1 10/2003

OTHER PUBLICATIONS

3GPP TS 24.234 V1.0.0, 3rd Generation Partnership Project; Technical Specification Group Core Network; 3GPP System to WLAN Interworking; UE to Network protocols; Stage 3 (Release6), Dec. 2003, pp. 1-19.
3GPP TS 24.234, V1.0.0: 3rd Generation Partnership Project; Technical Specification Group Core Network; 3GPP System to WLAN Interworking; UE to Network protocols; Stage 3 (Release 6).

* cited by examiner

*Primary Examiner* — Christopher M Brandt
(74) *Attorney, Agent, or Firm* — Mintz, Levin, Cohn, Ferris, Glovsky & Popeo, P.C.

(57) ABSTRACT

A method of probing a node that includes sending a request to the node and determining, at the node, network identity information. Also, a system that includes at least one node and at least one client, wherein a client in the system sends a request to a node in the system, wherein the request includes part of the network identity information and wherein the node is configured to determine network identity information containing the part of the identity information. Further, a node in the system, wherein the node includes a receiving means and a connection means.

34 Claims, 2 Drawing Sheets

METHOD OF PROBING A NODE

REFERENCE TO RELATED APPLICATIONS

This application claims priority of British Application No. 0402893.2, filed on Feb. 10, 2004 in United Kingdom. The subject matter of this earlier filed application is hereby incorporated by reference.

FIELD OF THE INVENTION

The present invention relates to a method of probing a node, and in particular but not exclusively to a method of probing an access node.

BACKGROUND OF THE INVENTION

The communication system is a facility that enables communication between two more entities such as user terminal equipment and/or network entities and other nodes associated with the communication system. The communication may comprise, for example, a communication of voice, electronic mail (email), text messages, data, multimedia and so on.

A communication may be provided by a fixed line and/or wireless communication interfaces. A feature of wireless communication system is that they provide mobility for the users thereof. An example of communication systems providing wireless communication is a public land mobile network (PLMN). An example of the fixed line system is a public switched telephone network (PSTN).

The communication system typically operates in accordance with a given standard or specification which sets out what the various elements of a system are permitted to do and how that should be achieved. For example, the standard or specification may define if the user or more precisely user equipment is provided with a circuit switched server or a packet switched server or both. Communication protocols and/or parameters, which should be used for the connection, are also typically defined. For example, the manner in which communication is implemented between the user equipment and the elements of the communication network is typically based on a predefined communication protocol. In other words, a specific set of rules on which the communication can be based needs to be defined to enable the user equipment to communicate via the communication system.

The 3G partnership project (3GPP) is defining a reference architecture for the universal mobile telecommunication system (UMTS) core network which will provide the users of user equipment with access to services. The term "service" used in this document should be understood to broadly cover any services or goods which a user may desire, require or be provided with. The term is to be understood to cover the provision of complementary services. In particular, but not exclusively, the term "service" will be understood to include internet protocol multimedia IM services, conferencing, telephoning, gaming, rich call, presence, e-commerce, messaging and instant messaging.

Reference will be made to the 3GPP technical specification TS24.234 and TS23.234, both documents, which are hereby incorporated by reference. Both of these documents relate to WLAN (wireless local area network) inter working. WLAN inter working is inter working between a proposed 3GPP system and the WLAN family of standards. Examples of WLAN radio network type technology include Bluetooth, the IEEE standards 802.11B, 802.11G, 802.11A and HIPERLan-2. The wireless local area network inter working allows a WLAN UE (user equipment) to connect to a WLAN and from there to either a visited PLMN or the home HPLMN. The PLMNs are 3G communication systems. A WLAN UE is all the user equipment, which can be used to allow a 3GPP subscriber to access the WLAN inter working. This may include, for example a computer. It should be appreciated that the WLAN UE may be capable of WLAN access only or may be capable of WLAN and 3GPP system access. A WLAN UE is only one example of a client.

In the proposed specification, the network selection procedure consists of two parts. The first part is radio selection. This is the first phase of network selection and always takes place before VPLMN (visited PLMN) selection. In this phase the WLAN UE selects an access point AP and associates itself with it. The parameter used for the selection of the access point is the SSID (service set ID). In the second part, the VPLMN is selected. After selecting an access point, that is after completion of the radio selection, the WLAN UE may need to select a PLMN through which to authenticate, if more than one is available behind the chosen WLAN. This is called VPLMN selection in the WLAN inter working.

IEEE specifications such as 802.11 currently have two alternatives for probing. In one of these alternatives, a WLAN client (for example a WLAN UE) is able to probe for a particular SSID. In the other of the alternatives, broadcast is used where all the SSIDs supported by WLAN access node are probed.

However, the inventor has appreciated that the known probing arrangements are not particularly flexible and do not, for example permit a certain type of SSIDs to be probed.

SUMMARY OF THE INVENTION

According to a first aspect in the present invention there is provided a method of probing a node, said method comprising the steps of sending a request to said node comprising part of network identity information and determining at said node network identity information containing said part of the identity information.

According to a second aspect in the present invention there is provided a system comprising at least one node and at least one client, one of said client arranged to send a request to said node comprising part of network identity information; and said node is arranged to determine network identity information containing said part of the identity information.

According to a third aspect in the present invention, there is provided a client in a system comprising at least one node and at least one client, said client arranged to send a request to said node comprising part of network identity information.

According to a fourth aspect in the present invention, there is provided a node in a system comprising at least one node and at least one client, comprising means for receiving from one of said clients a request comprising part of network identity information, said node being is arranged to determine network identity information containing said part of the identity information.

According to a fifth aspect in the present invention, there is provided a method of probing a node, said method comprising the steps of sending a request to said node identifying at least one group, said group comprising a plurality members having different network identity information and determining at said node at least one member of said group.

BRIEF DESCRIPTION OF THE DRAWINGS

For a better understanding of the present invention and as to how the same may be carried into effect, reference will now be made by way of example only to the accompanying drawings in which.

DETAILED DESCRIPTION OF PREFERRED EMBODIMENTS OF THE INVENTION

It should be appreciated that whilst embodiments of the present invention are described in the context of a 3GPP WLAN, embodiments of the present invention have broad application and can be used in the context of any WLAN environment. Thus embodiments of the invention may only be applicable to 802.11 networks or the like or may apply across a plurality of different standards.

SSID is short for service set identifier, a 32-character unique identifier attached to the header of packets sent over a WLAN that acts as a password when a mobile device tries to connect to the BSS. The SSID differentiates one WLAN from another, so all access points and all devices attempting to connect to a specific WLAN must use the same SSID. A device will not be permitted to join the BSS unless it can provide the unique SSID.

An SSID is also referred to as a network name because it is a name that identifies a wireless network.

Figure 1:
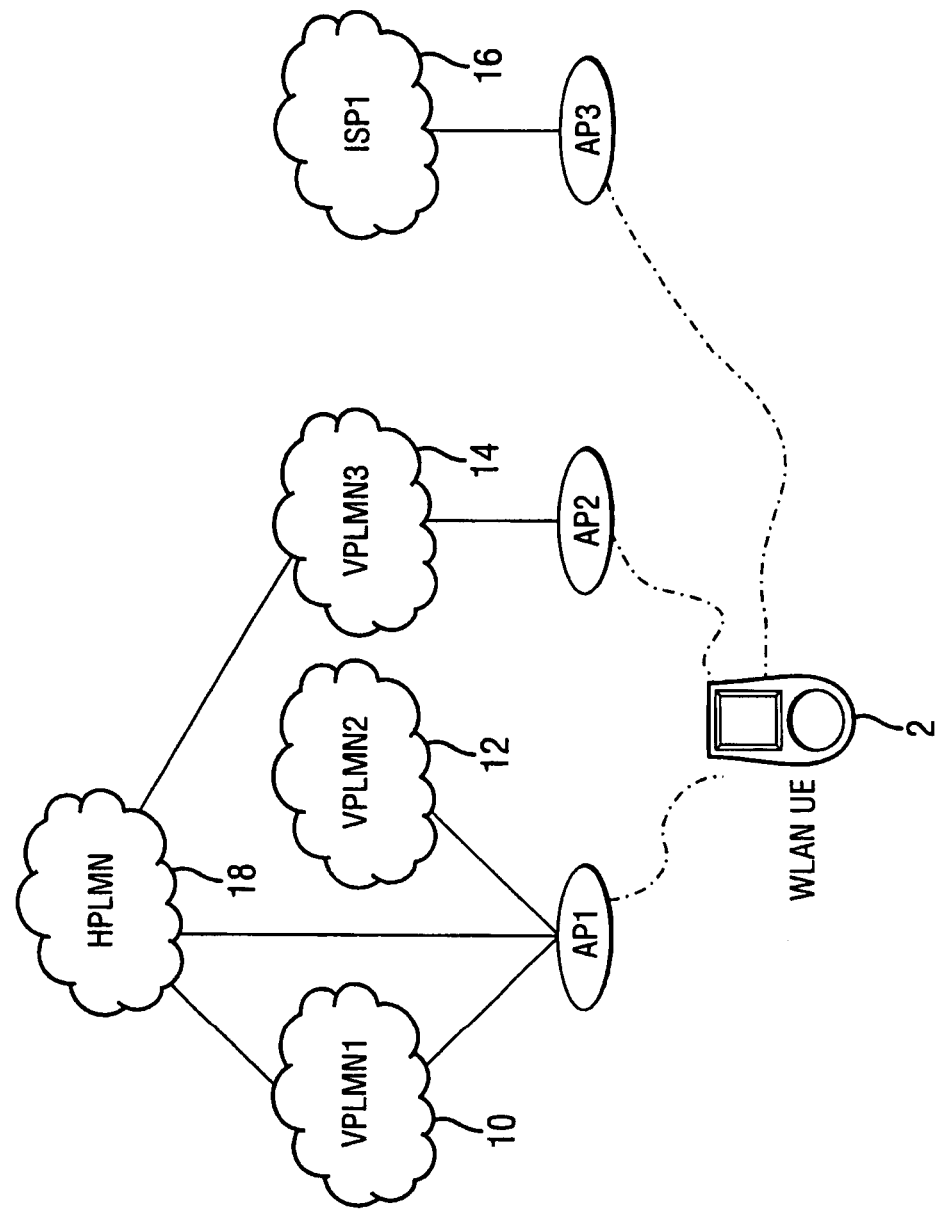
FIG. 1 shows schematically an environment in which embodiments of the present invention can be implemented.

Reference is made to FIG. 1, which shows an environment in which embodiments of the present invention can be implemented. WLAN user equipment 2 is shown. As mentioned previously, WLAN UE 2 can be arranged to communicate just with WLANs or with both WLANs and 3GPP networks. The UE includes all equipment that is in possession of the end user, such as a computer, WLAN radio interface adapter etc. The UE may for example be a personal digital assistant (PDA), portable computer, fixed computer, mobile telephone or combinations thereof.

The WLAN UE is arranged to make a connection with an access point (AP). In the arrangement shown in FIG. 1, three access points, AP1, AP2 and AP3 are shown. All of these access points are provided in different WLANs. It should be appreciated that some embodiments of the present invention, a WLAN may have more than one access point and where there is more than one access point, the WLAN UE may be capable of accessing more than one access point of a given WLAN. The same access point can allow access to more than one different WLAN.

The respective WLAN access networks, of which the three APs, AP1-3 form a part are not shown but may also include intermediate AAA (authentication, authorisation and accounting) elements. A WLAN may include other devices such as routers.

The first access point AP1 is connected to a first VPLMN 10 and a second VPLMN 12.

The first access point AP1 is also connected to a second VPLMN 12. However, this second VPLMN 12 is not able to make a connection to the HPLMN 18. This may for example because for example there is no appropriate roaming agreement with the HPLMN 18. Finally the first access point is also directly connected to the HPLMN 18.

The second access point AP2 is connected to a third VPLMN 14. The third VPLMN 14 has a connection to the HPLMN 18.

The third access point AP3 is connected to an internet service provider 16. This allows the user to access the Internet.

Figure 2:
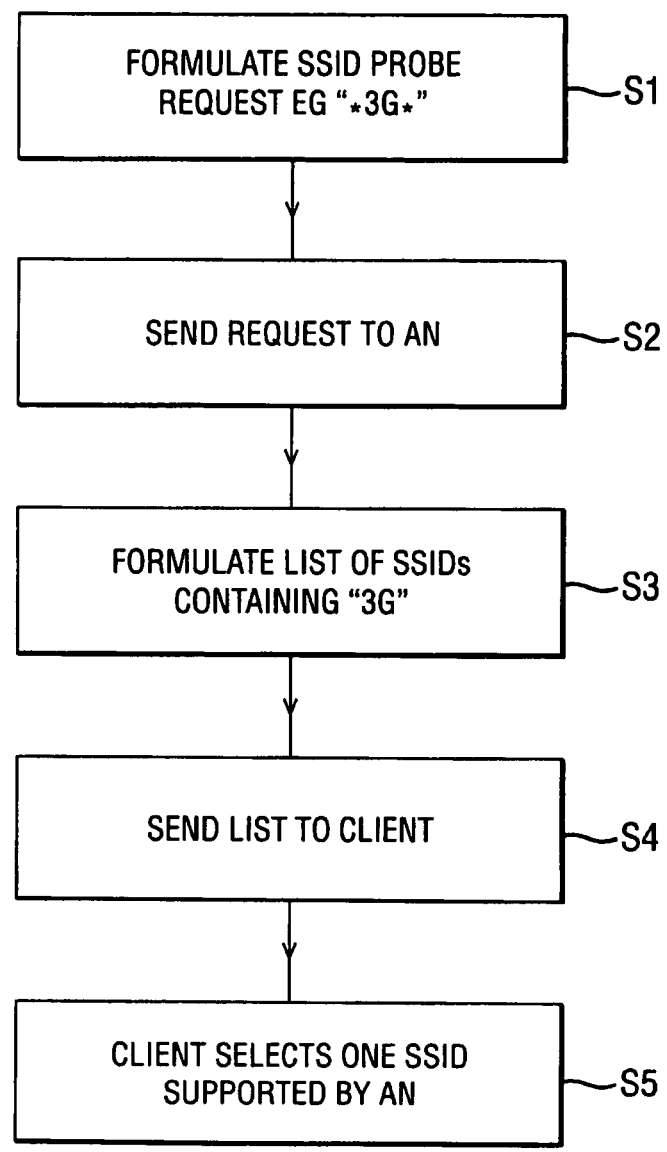
FIG. 2 shows a flow diagram for a method embodying the present invention.

In embodiments of the invention the WLAN UE, is able to request information in a probe request about the support of SSIDs containing a particular string. Reference is made to FIG. 2 which shows a flow diagram of a method embodying the present invention.

In this document access node should be interpreted broadly. An access point is one example of an access node.

The access node AN or nodes to which the probe request has been sent responds by giving a list of SSIDs which include the particular string. The SSID may give information as to the network, domain or the like to which the AN is connectable.

For example the client requests information about the support of SSIDs containing 3G as part of the SSID. For example, the request may be probe_request with "*3G*". The request may thus contain part of the string that is included in the SSID. In step S1, the request is formed by the client, for example the WLAN UE. The WLAN UE or client may store in its memory the criteria for requests such as described in step S1. Examples of possible criteria are—a list of strings preferred by the operator or user and stored in the WLAN UE; or a predefined group of SSIDs (in order to save signalling) stored in the WLAN UE.

In alternative or additionally, the SSIDs could be divided into groups. The different groups may have different characteristics such different operators, different tariffs, different standards or the like. Thus the probe request may be for a string '*3g*' or a probe request for a group of SSIDs 'group 1', where 'group 1' could be for example 'group 1: SSID1; SSID2; . . . ; SSIDn'. The grouping may be predefined in both the WLAN UE and the AN or only in one of them.

In step S2, the request is sent to the AN.

In S3, the AN determines which SSIDs contain the partial or complete string contained in the request. In this embodiment, the SSIDs containing the string 3G are identified and formulated into one or more responses to the client. Thus the AN is able to perform SSID searches or screening according to the parameters in the probe request in order to find a match between the keywords or the group of SSIDs indicated in the request; and the SSIDs the AP supports. This may be done at the MAC (media access control) level or above.

In step S4 the response(s) including the SSIDs matched in the search/screening is/are sent to the client. This may be sent in a probe response. The format used may be similar to that used for responses to broadcast probe requests. Separate responses may be provided for each SSID meeting the criteria or more preferably, the SSID information elements (described in more detail later) are included in the response.

In step S5, the client selects one of the SSID supported by the AN and included in the response(s) and proceeds with the known network or the like selection procedures. Thus the client is able to receive responses from the AN.

In one alternative embodiment, in step S3, the first SSID containing the identified string or partial string to be identified is sent to the client rather than a list. In this modification, a list may not be produced. In another modification, a selection is made is step S3 as to which SSID or SSIDs is or are to be sent to the client. This means that the AN rather than the client would be doing the SSID selection. In yet another embodiment of the invention, the client and the AN would be involved in the decision to select the SSID. It should be appreciated that in some embodiments of the invention, the decision about the SSID to be selected can be made in a node different to the client and the AN.

In one alternative, the AN may respond in a wildcarded format. This indicates to the client that it may select any SSID which includes a certain string; or in the case of grouping that it may select any SSID from the mentioned group.

In the IEEE standard 802.11 clause 7.3.2.1, the SSID element is defined. The SSID element has a first octet containing the element identity. This is followed by a second octet containing length information. It should be appreciated that a 0 length information field indicates the broadcast SSID. This is followed by the SSID itself. The SSID information field is between 0 and 32 octets.

In embodiments of the invention, the SSID information contained in the information field is compared with the part of the string contained in the probe request.

Embodiments of the present invention may be used in conjunction with the known probe requests, that is for a particular SSID or a broadcast request for all SSIDs which are supported.

Embodiments may be used where the SSID information contains some characteristic information such as the type of networking supported eg 3G or about the network operator for example Orange.

In practice the information may comprise coding so the request would include the coding associated with the required information or the information itself. In the latter case, the AN would need to translate the "3G" information to the required coding and then find the SSIDs containing the required coding. Where coding is used, the position of the code in the SSID information may be important. In that case a masking or a matching technique could be used to identify the required SSIDs.

The described preferred embodiments of the invention have been described in the context of inter-working with a 3G network. Embodiments of the invention may also be applied to other types of network including the Internet and other types of communication network, which may be based on wired or wireless technologies. Embodiments of the invention are not just applicable to the SSID but can be used with any information element which is used to provide network support information.

In embodiments of the invention probe requests and responses are described. Embodiments of the invention are applicable to any other message sequence.

The invention claimed is:

1. A method, comprising:
   receiving a request at a node, the request comprising a string of network identity information, wherein the string of network identity information comprises a part of at least one of network characteristic information and network operator information, wherein the string of network identity information includes a wildcard service set identifier;
   determining, at the node, whether network identity information of one or more networks supported by the node contains the string of network identity information, the network identity information of the one or more networks comprising at least one of network characteristic information and network operator information; and
   sending a response comprising the determined network identity information of the one or more networks.

2. The method as claimed in claim 1, wherein said node comprises an access node.

3. The method as claimed in claim 1, further comprising: sending a plurality of said determined network identity information to a sender of said request.

4. The method as claimed in claim 1, further comprising: selecting one of the determined network identity information.

5. The method as claimed in claim 4, wherein said selecting is carried out by said node.

6. The method as claimed in claim 1, wherein said network identity information comprises a service set identifier.

7. The method as claimed in claim 1, wherein said node comprises a wireless local area network entity.

8. The method as claimed in claim 1, wherein said receiving further comprises receiving wireless local area network identity information as said network identity information.

9. An apparatus, comprising:
   a transmitter configured to send a request to a node, the request comprising a string of network identity information, wherein the string of network identity information comprises a part of at least one of network characteristic information and network operator information, wherein the string of network identity information includes a wildcard service set identifier, wherein the request sent to the node enables the node to determine whether network identity information of one or more networks supported by the node contains the string of network identity information, the network identity information of the one or more networks comprising at least one of network characteristic information and network operator information; and
   a receiver configured to receive a response comprising the determined network identity information of the one or more networks.

10. The apparatus as claimed in claim 9, further comprising:
    a processor configured to formulate said request.

11. The apparatus as claimed in claim 9, wherein the apparatus is configured to be connected with a network identified by said network identity information.

12. The apparatus claimed in claim 9, wherein the apparatus comprises a wireless local area network entity.

13. The apparatus as claimed in claim 9, wherein said network identity information comprises wireless local area network identity information.

14. The apparatus as claimed in claim 9, wherein said node comprises an access node.

15. The apparatus as claimed in claim 9, further comprising:
    a processor configured to select one of the network identity information.

16. The apparatus as claimed in claim 9, wherein said network identity information comprises a service set identifier.

17. An apparatus, comprising:
    a receiver configured to receive a request comprising a string of network identity information, wherein the string of network identity information comprises a part of at least one of network characteristic information and network operator information, wherein the string of network identity information includes a wildcard service set identifier;
    a processor configured to determine whether network identity information of one or more networks supported by the node contains the string of network identity information, the network identity information of the one or more networks comprising at least one of network characteristic information and network operator information; and
    a transmitter configured to send a response comprising the determined network identity information of the one or more networks.

18. The apparatus as claimed in claim 17, where said apparatus comprises an access node.

19. The apparatus as claimed in claim 17, wherein the transmitter is further configured to send a plurality of said determined network identity information to a sender of said request.

20. The apparatus as claimed in claim 17, wherein the processor is configured to select one of the network identity information.

21. The apparatus as claimed in claim 17, wherein said network identity information comprises a service set identifier.

22. The apparatus as claimed in claim 17, wherein the apparatus comprises a wireless local area network entity.

23. The apparatus as claimed in claim 17, wherein said network identity information comprises wireless local area network identity information.

24. A method, comprising:
sending a request to a node, the request comprising a string of network identity information, wherein the string of network identity information comprises a part of at least one of network characteristic information and network operator information, wherein the string of network identity information includes a wildcard service set identifier, wherein the request sent to the node enables the node to determine whether network identity information of one or more networks supported by the node contains the string of network identity information, the network identity information of the one or more networks comprising at least one of network characteristic information and network operator information; and
receiving a response comprising the determined network identity information of the one or more networks.

25. The method as claimed in claim 24, further comprising: formulating said request.

26. The method as claimed in claim 24, further comprising: connecting to a network identified by one of said determined network identity information of the one or more networks.

27. The method as claimed in claim 24, wherein said node comprises an access node.

28. The method as claimed in claim 24, further comprising: selecting one of the received determined network identity information of the one or more networks.

29. The method as claimed in claim 28, wherein said selecting is carried out by said sender of said request.

30. The method as claimed in claim 24, wherein said network identity information comprises a service set identifier.

31. The method as claimed in claim 24, wherein said node comprises a wireless local area network entity.

32. The method as claimed in claim 24, wherein said sending comprises sending wireless local area network identity information as said network identity information.

33. A computer program embodied on a non-transitory computer-readable medium, the program configured to control a processor to perform a process, the process comprising:
receiving a request at a node, the request comprising a string of network identity information, wherein the string of network identity information comprises a part of at least one of network characteristic information and network operator information, wherein the string of network identity information includes a wildcard service set identifier;
determining, at the node, whether network identity information of one or more networks supported by the node contains the string of network identity information, the network identity information of the one or more networks comprising at least one of network characteristic information and network operator information; and
sending a response comprising the determined network identity information of the one or more networks.

34. A computer program embodied on a non-transitory computer-readable medium, the program configured to control a processor to perform a process, the process comprising:
sending a request to a node, the request comprising a string of network identity information, wherein the string of network identity information comprises a part of at least one of network characteristic information and network operator information, wherein the string of network identity information includes a wildcard service set identifier, wherein the request sent to the node enables the node to determine whether network identity information of one or more networks supported by the node contains the string of network identity information, the network identity information of the one or more networks comprising at least one of network characteristic information and network operator information; and
receiving a response comprising the determined network identity information of the one or more networks.

* * * * *